United States Patent [19]

Hilleman et al.

[11] 3,906,092

[45] Sept. 16, 1975

[54] STIMULATION OF ANTIBODY RESPONSE

[75] Inventors: Maurice R. Hilleman, Lafayette Hill; Alfred A. Tytell, Lansdale; Allen F. Woodhour, Horsham, all of Pa.

[73] Assignee: Merck & Co., Inc., Rahway, N.J.

[22] Filed: Nov. 26, 1971

[21] Appl. No.: 202,565

[52] U.S. Cl. .................................. 424/89; 424/361
[51] Int. Cl.² ........................................ A61K 39/12
[58] Field of Search ................. 424/85, 89, 180, 88

[56] References Cited
OTHER PUBLICATIONS

Hilleman (1), The American Review of Respiratory Diseases, Vol. 90, No. 5, pages 694–699, Nov. 1964.

Hilleman (2), J. Cell. Physiol., Vol. 71, pages 43–59, Feb. 1968.

*Primary Examiner*—Richard L. Huff

[57] ABSTRACT

The antibody response to an adjuvant type vaccine is augmented by incorporation in the vaccine of a polynucleotide or a complex of polynucleotides.

15 Claims, No Drawings

STIMULATION OF ANTIBODY RESPONSE

This application is a continuation-in-part of copending Application Ser. No. 11,891, filed Feb. 16, 1970, which was a continuation-in-part of Ser. No. 761,004, filed Sept. 19, 1968, both now abandoned.

This invention relates to vaccines in general and particularly to vaccines containing agents which will increase the antibody response to the antigens.

Antigens are substances which stimulate the production of antibodies which, in turn, represent a major mechanism of the body to protect if from infective or allergic processes. The careful use of antigenic materials can result in the controlled induction of immunity or desensitization in living organisms. This is accomplished by the use of vaccines, allergen preparations and the like. Oftentimes, difficulties are experienced with antigenic substances in that their administration results in only poor or fair antigenic stimulation. Such suboptimal antigenicity can be partially overcome by the use of substances known as adjuvants which have the ability to enhance antigenicity. This invention relates to substances which can be added to adjuvants to enhance further their ability to stimulate antigenic activity.

The feature of the present invention is that the combination of polynucieotide material wtih an adjuvant results in an effect whereby the immune response is enhanced even when antibody response to aqueous type antigen is inhibited by the same type and quantity of polynucleotides. This enhanced immune response is most surprising when it is realized that the situs and mode of operation of antigens and polynucleotides are vastly different. Antigens induce the formation of antibodies while the polynucleotides are known to induce the formation of interferon (Hilleman, J. Coll. Physiol., 71, 43–59, 1968). These two immune mechanisms are so vastly different in how and where they act that one could not have expected that the antibody enhancement known to result from adjuvants (Hilleman, *The American Review of Respiratory Diseases*, Vol. 90, No. 5, pages 694–699, Nov. 1964) would be still further increased by the copresence of polynucleotides.

Antibodies are synthesized only in immune competent cells (lymphoid cells). They are formed in relatively huge quantities in well-identified protein fractions of the serum. They act by combining outside the cells with the antigen and thus prevent the latter to penetrate a new cell and replicate itself. Once a virus enters a cell, antibodies can no longer inhibit its replication. They are specific to the antigen which evoked their formation--thus antibodies against measles have no effect on influenza virus but will neutralize measles antigen when transferred from one individual to another They persist for months and even years. Further, antigens tend to stimulate division of target cells.

In contrast, the immune mechanism known as interferon, whose formation is induced by polynucleotides, operates inside the cell. Interferons are species specific and must be formed in the cells of the animal under attack by the antigen. They cannot be transferred to another individual and retain their activity. They are synthesized in almost all cells in the body. They have a very short half life--e.g., interferon in rabbits is gone from the circulation within 8 to 24 hours. They are broad spectrum in their activity, being active against any replicating antigen such as herpes, vesicular stomatitis, mengo virus, rabies, etc. and other non-virus replicating antigens such as trachoma and malaria parasites. Interferons have no activity against non-replicating antigens such as proteins, polysaccharides, hemagglutinins, hemolysins, allergens, bacterial toxins, etc., killed virus or against interferon stimulating polynucleotides. The mode of action thus is to prevent replication, inside the target cell and they have no tendency to produce proliferation of target cells.

In view of these vast differences in mode of operation, situs of action, duration of activity, etc., it is most surprising to find that the antibody formation by antigens, enhanced by adjuvants, is still further enhanced by the addition of polynucleotides (which are interferon inducers, not antibody producers).

While one investigator suggested (Litvinov Antibiotiki, 12(7), 602, 1967; Chem. Abst. 67, 7636, 1967) that concommitant adminstration to chickens of a live Newcastle disease virus vaccine (i.e., a replicating antigen) and of interferon enhanced the protection of the animals, one cannot, from this, predict that a polynucleotide will react synergystically with a non-replicating antigen--adjuvant combination to enhance greatly the antibody production of the latter. The polynucleotide presumably would produce interferon in target cells. Meanwhile, in another part of the tissue, the antigen-adjuvant combination is producing antibodies and there are no grounds for expecting any interaction, let alone a tremendous enhancement of antibody production, since there is nothing in the prior art to suggest any effect by a replication-preventive on a non-replicating antigen.

Braun and Nakano (Science, 157:819. Aug. 1967) published the results of their use of certain polynucleotides as stimulators of the immune mechanism. They there reported their observations that certain polynucleotide complexes enhance the early rate of increase in numbers of antibody-forming spleen cells in mice immunized with sheep red blood cells or other particulate antigens, although the total number of such cells was not increased.

However, experiments conducted in developing the novel methods and compositions of this invention have shown that the addition of high molecular weight polynucleotide materials to aqueous type vaccines without the presence of adjuvants either produces no stimulatory effect or actually depresses antibody production.

Braun and Nakano [Proc. Soc. exp. Biol. Med. 119, 701–705 (1965)[ have also published results of studies showing that oligodeoxyribonucleotides of about 2 to 5 nucleotide units can stimulate the antibody response to certain antigens for about only 48 hours following administration, and that the presence of higher molecular weight oligodeoxyribonucleotides can interfere with this stimulatory activity.

Experiments conducted in accordance with this invention have shown that oligodeoxyribonucleotides do not enhance the activity of the known adjuvants. On the other hand, the addition of the polynucleotide materials useful in the novel compositions of this invention to adjuvant type vaccines does enhance the antibody response to levels far higher than achieved by the adjuvant vaccine alone and has the added advantage that the antibody levels are retained for longer periods of time than would be expected for known aqueous type or adjuvant type vaccines.

The adjuvants that are useful in this invention are the emulsion type adjuvants well known in the science of immunology. Such known emulsion type adjuvants include water-in-vegetable oil, water-in-mineral oil, and vegetable oil-in-water. Any vegetable oil known to be suitable for use in injectable preparations and which satisfy the specifications of U.S. Pharmacopeia or National Formulary can be employed as the vegetable oil phase in the adjuvants contemplated for use in this invention, such as peanut oil, corn oil, olive oil, sesame oil, chaulmoogra oil, cotton seed oil, oil of sweet almond and persic oil.

Antigens useful for purposes of this invention are those that can be used with an emulsion type adjuvant and may be in the form of purified or partially purified antigen derived from bacteria, viruses, pleuoropneumonia-like (PPLO) organisms, rickettsia or their products, or the antigen may be an allergen such as dusts, danders, or in the form of a poison or a venom derived from insects or reptiles. In all cases the antigens will be in the form in which their toxic or virulent properties have been reduced or destroyed and which when introduced into a suitable host will either induce active immunity by the production therein of antibodies against the specific micro-organisms, extract or products of micro-orgnaisms used in the preparation of the antigen or, in the case of allergens, they will aid in alleviating the allergy due to the specific allergen. The antigens can be used either singly or in combination, for example, multiple bacterial antigens can be employed, multiple viral antigens, multiple rickettsial antigens, multiple bacterial or viral toxoids, multiple allergens or combinations of any of the foregoing products can be combined in the aqueous phase of the adjuvant composition. Antigens of particular importance are derived from bacteria such as *H. pertussis, Leptospira pomona* and *icterohaemorrhagiae, S. typhosa, S. paratyphi A* and *B, C. tetani, C. botulinum, C. perfringens, D. feseri* and other gas gangrene bacteria, *B. anthracis, P. pestis, P. multocida, V. cholerae* and the like; form viruses as poliovirus (multiple types), adenovirus (multiple types), parainfluenza virus (multiple types), measles, mumps, respiratory syncytial virus, influenza (various types), shipping fever virus (SF4), Western and Eastern equine encephalomyelitis, Japanese B. encephalomyelitis, Russian Spring-Summer encephalomyelitis, hog cholera virus, Newcastle disease virus, fowl pox, rabies, feline and canine distemper and the like viruses; from rickettsiae as epidemic and endemic typhus or other members of the spotted fever group, from various spider and snake venoms or any of the known allergens for example from ragweed, house dust, pollen extracts, grass pollens and the like.

The polynucleotide materials of the novel composition of this invention include homopolymers, double stranded complexes of the homopolymers, alternating copolymers, copolymers of random distribution, double stranded naturally occurring ribonucleic acids, hybrid double stranded complexes of homopolymers, and chemically altered polynucleotides.

The homopolymers contemplated by the novel compositions of this invention are polynucleotides such as polyinosinic acid (I), polycytidylic acid (C), polyadenylic acid (A), polyuridylic acid (U), polyxanthylic acid (X), polyguanylic acid (G), and polydehydrouridylic acid (DHU). These compounds are well known in the art, commercially available and represent a spectrum of molecular weights the range of which is difficult to determine with accuracy. However, sedimentation studies have indicated $S_{20}^w$, values between about 3 and about 12 which indicate molecular weights of approximately $1 \times 10^5$ to $1.5 \times 10^6$.

The double stranded complexed homopolymers are complexes formed of two different homopolymers and are designated by such as poly I:C and poly A:U indicating a complex of polyinosinic acid (I) and polycytidylic acid (C) and a complex of polyadenylic acid (A) and polyuridylic acid (U) respectively. All the possible combinations are included within the scope of this invention. The double stranded complexes and their preparations are well known in the art. One method commonly employed is to mix the two selected homopolymers in equimolar concentration in phosphate-buffered saline at pH 7.0 (0.006M sodium phosphate, 0.015M sodium chloride) and the complex formation develops instantaneously after mixing as indicated by a hypochromic effect.

The alternating copolymers useful in the novel composition of this invention, as the name implies, are copolymers of two different nucleotides in which the two nitrogenous bases appear in a regular alternating fashion, and are designated as poly CU, poly IU, poly AC, poly GU, poly AG, poly IC, poly AU, poly AI, and so forth which signify alternating copolymers of C and U, I and U, A and C, G and U, A and G, I and C, A and U, and A and I respectively. Copolymers of this type are also well known in the art and may be prepared through the action of RNA polymerase. The molecular weights as in the case of the homopolymers are not uniform but are in the range of $1 \times 10^5$ to $1.5 \times 10^6$. These polymers mimic the action of the double stranded complexes of homopolymers by double stranding about themselves through hydrogen bonding of the alternating complementary bases.

Naturally occurring double-stranded ribonucleic acids (DS-RNA) with a molecular weight of $1 \times 10^5$ to about $1.5 \times 10^6$ are also useful in the novel composition of this invention. These are well known materials preparable in known manner from various sources.

The hybrid double stranded polymers useful in the novel compositions of this invention are similar to the complexed homopolymers described about but differ in that one of the homopolymers is a polydeoxyribonucleotide of adenine (dA), thymine (dT), cytosine (dC), uracil (dU), hypoxanthine (dI), or guanine (dG) each with molecular weights in the range of $1 \times 10^5$ to $1.5 \times 10^6$. These polydeoxyribonucleotides are known compounds and the hybrid double stranded polymers suc as poly G:dC, poly dG:C, poly I:dC and poly dI:C are also known complexes and are prepared in a manner similar to that described above for the double stranded complexed polymers.

Chemically altered polynucleotides useful in the novel process of this invention include the known compounds, poly $N_1$-methyladenylate, poly "6-methyladenylate", poly $N_7$-methylinosinate, poly $N_7$-methylguanylate, poly 5-methyluridylate, poly 5-fluorouridylate, poly 5-bromouridylate, poly 5-iodouridylate, poly 5-bromocytidylate and poly 5-iodocytidylate.

The preparation of the novel compositions of this invention comprises mixing the three components; adjuvant, aqueous antigen, and polymeric material, in the appropriate proportions in any convenient manner.

The concentration of polymeric material that may be used encompasses a range from fractions of a microgram to just below levels which demonstrate tissue toxicity in the host, animal or human, to which it is to be given, i.e. up to about 10 milligrams/dose. The dose adminstration will vary with the host and with the nature of the adjuvant, the selected polynucleotide and the antigen. The polynucleotides are usable in this invention at doses below those at which they induce the formation of interferon.

The antigen concentration of any given adjuvant-containing preparation may be adjusted to be equal to an aqueous preparation with resultant enhancement of antibody response by virtue of adjuvant activity or it may be reduced to levels below aqueous preparations to economize on antigen with retention of antigenic activity comparable to aqueous preparations. Thus, the obvious advantages of adjuvant activity are accentuated further by the addition of polynucleotides.

Braun and Nakano, Science 157, 819 (1967), state that the use of polynucleotides are advantageous immunologically in that their combination with an antigen increases the rate of antibody formation. The important aspect of the present invention is the fact that the actual quantity of antibodies elicited by an adjuvant type vaccine is increased when the polynucleotide materials are combined therewith. Such increased antibody levels result in greater immunity than can be achieved with aqueous type preparations or when adjuvants are used without added polynucleotides. As is stated above, an extremely small addition of a selected polynucleotide to known vaccine types, i.e., those made up of an antigen and an adjuvant, will serve to augment the antibody response in accordance with this invention.

Representative examples are the following:

EXAMPLE 1

Adjuvant 65, a material consisting of 86% (v/v) refined peanut oil, 10% (v/v) mannide monooleate (Arlacel A) and 4% (v/v) aluminum monostearate was combined with aqueous type influenza virus vaccine containing 4800 CCA (chicken cell agglutinating) units of influenza virus antigens per ml. ($A_2$/Japan/170/62, 800 CCA units/ml; $A_2$/Taiwan/-1/64, 800 CCA units/ml. A/PR/8/34, 1600 CCA units/ml; and B/Mass/3/66, 1600 CCA units/ml.) or 1200 CCA units of influenza virus antigens per ml. to produce a water-in-oil emulsion containing a final antigen concentration of 600 CCA units/0.5 ml or 150 CCA units/0.5 ml.

Antigenically comparable aqueous type vaccine also was prepared.

Each of the vaccine preparations was used with or without added polynucleotides (poly I:C or poly A:U) as shown in Tables I$a$–I$d$. When polynucleotides were added, they were used at a concentration of 260 $\mu$g/dose.

These materials were injected intramuscularly into guinea pigs at a dose level of 600 CCA units on one occasion (Table I$a$) or on two occasions a month apart (Table I$b$) or at a dose level of 150 CCA units on one occasion (Table I$c$) or on two occasions a month apart (Table I$d$).

All animals were bled immediately prior to injection and monthly thereafter for an indefinite period. Sera were assayed serologically for antibody by the hemagglutination-inhibition (HI) technique. The results of these assays are presented in Tables I$a$–I$d$.

It can be seen from Tables I$a$ and I$b$ that with the 600 CCA unit dose the polynucleotides did not enhance the antigenicity of aqueous type influenza vaccine when only one dose was given. There was some enhancement when two doses were given. Adjuvant 65 without added polynucleotides used in one or two doses enhanced antigenicity to such an extent that antibody production was stimulated to levels higher than those which were obtained following use of aqueous type antigen with or without polynucleotides. Addition of the polynucleotides to the adjuvant vaccines stimulated antibody production to still higher levels whether on the one or two dose regimen. The stimulatory effect was most apparent in the later months.

From Tables I$c$ and I$d$ it is seen that incorporation of poly A:U into aqueous type vaccine completely inhibited antibody response to all four influenza virus antigens whether one or two injections were given. On the other hand the incorporation of poly I:C into the aqueous type vaccine neither inhibited nor enhanced antibody response when compared to the antibody response of recipients of aqueous type vaccine alone. The adjuvant activity of adjuvant 65 is clearly demonstrated as is further enhancement by the addition of polynucleotides.

EXAMPLE 2

Adjuvant 65 type vaccine with without poly I:C (260 Mg./dose) or aqeous type influenza vaccine as described in Example 1 were prepared to contain 600 CCA units of influenza virus antigen and were injected into African green monkeys intramuscularly. The animals were bled immediately prior to injection and at monthly intervals thereafter. Sera were assayed serologically for HL antibody responses. The results are presented in Table II. It can be seen that the adjuvant 65 type vaccine without polynucleotide complex enhanced the antigenicity of all influenza antigens relative to aqueous type vaccine. Furthermore, the addition of poly I:C to the adjuvant increased significantly its effect. All influenza virus strains behaved similarly.

EXAMPLE 3

Purified trivalent influenza vaccine (B/Mass, $A_2$/-Japan/170, and $A_2$/Taiwan) was emulsified with incomplete Freund adjuvant, with or without poly I:C as was prepared as aqueous type vaccine with or without poly I:C. Guinea pigs were injected intramuscularly with one of the respective preparations at dose levels of 600 CCA units of virus and 263 $\mu$g. of poly I:C. The animals were bled immediately before injection and each month thereafter. Sera were assayed serologically by the HI method.

The results are depicted in Table III which shows the very effective adjuvant activity of incomplete Freund adjuvant. The enhancing effect of the test, is obvious. Again, no antigenic enhancement was given to the aqueous type vaccine by the addition of Poly I:C.

EXAMPLE 4

The procedure of Example 3 was followed except that the incomplete Freund adjuvant (water-in-mineral oil emulsion) was replaced by a vegetable oil-in-water emulsion consisting of 9 parts of purified peanut oil, 0.4 parts of Arlacel 80, and 0.6 parts of Tween 80 emulsified with an equal volume of aqueous type vaccine.

The results are described in Table IV which shows a very slight adjuvant effect of the oil-in-water emulsion with respect to the aqueous type vaccine with both $A_2$ influenza virus strains but not with the B strain. However, addition of poly I:C to the oil-in-water emulsion shows substantial adjuvant activity with respect to all of the antigens.

EXAMPLE 5

Trivalent influenza virus vaccine ($A_2$/Japan/170, $A_2$/Taiwan and B/Mass.) as aqueous type, alum adjuvant type or adjuvant 65 type vaccine with various combinations and concentrations of poly I, poly C and Poly I:C, was injected at dose levels intramuscularly into guinea pigs (10 animals/group) of 600 CCA units. The animals were bled immediately before injection and monthly thereafter for the serological assay of respondent HI antibody titers. The nature of the dose and the results of the HI antibody titers are recorded in Table V.

The table shows that 260 $\mu$. of Poly I completely inhibited the antigenic activity of both A and B type influenza viruses used as aqueous preparation. A twofold reduction in Poly I essentially eliminated the inhibitor activity. There did not appear to be any inhibitory or enhancing activity imparted by Poly C or the combined Poly I:C when used with aqueous type vaccine. A somewhat different situation was experienced with the alum type vaccine. There was an increase in antigenic activity of the alum adjuvant type vaccine without polynucleotide relative to aqueous type vaccine. The addition of Poly I, Poly C or Poly I:C to the material did not inhibit or enhance the alum adjuvant activity with any of the influenza virus strains. The antigenic activity of the adjuvant 65 type vaccine without polynucleotide was greater than either the aqueous or alum type vaccines. There did not appear to be any significant increase in antigenic enhancement with any of the influenza virus strains by the addition of Poly I or Poly C alone. The addition of complexed Poly I:C significantly increased antigenic activity to stimulate antibody production to levels which were far higher than those achieved with either the aqueous or alum type vaccines or which persisted so long.

EXAMPLE 6

A heptavalent respiratory vaccine containing influenza virus B/Mass (100 CCA/dose), influenza virus $A_2$/-Taiwan (100 CCA/dose), parainfluenza virus type 1 ($2 \times 10^{10}$ particles/dose), parainfluenza virus type 2 ($2 \times 10^{10}$ particles/dose), parainfluenza virus type 3 ($2 \times 10^{10}$ particles/dose), respiratory syncytial virus ($2 \times 10^{10}$ particles/-dose) and Mycoplasma pneumoniae (Eaton PPLO, 35 $\mu$g. DNA/-dose) was prepared as an adjuvant 65 type vaccine with 260 $\mu$g./dose of Poly I:C and without Poly I:C. The vaccines were injected intramuscularly into guinea pigs (6 animals/-group). The animals were bled on day zero and each month thereafter, and the sera were assayed serologically for antibodies by the appropriate procedure as indicated in Table VI.

The results are tabulated in Table VI and show that the addition of Poly I:C enhanced the adjuvant activity with all vaccine components.

EXAMPLE 7

Employing generally the procedures described in Example 1, various combinations of an aqueous trivalent influenza virus vaccine, ($A_2$/Japan/170, $A_2$/Taiwan, and B/Mass.) or adjuvant 65 type vaccine without or with various concentrations of poly I:C were injected intramuscularly into guinea pigs (12 animals/group). Hemagglutination-inhibition antibody assays were performed with sera obtained immediately prior to initiation of the study and 1 month later. The nature of the dose and the serological assay results are recorded in Table VII.

It can be seen that the addition to adjuvant 65 type vaccine of as little as 2.6 $\mu$g. of Poly I:C per dose significantly enhanced the adjuvant activity of the A type influenza viruses even when they were employed at a concentration of as little as 10 CCA units. The B strain of influenza virus was not similarly responsive under the same conditions. It required at least 26 $\mu$g. of Poly I:C to enhance further the adjuvant activity.

EXAMPLE 8

Other examples involve the replacement of the viruses and Mycoplasma pneumoniae used in Examples 1–7 with other known human and animal antigens, to produce injectable vaccines for humans and animals which contain in addition to the antigen and the adjuvant a polynucleotide, or polynucleotide complex.

EXAMPLE 9

Other examples of the invention are those in which the complexed homopolymers and the homopolymers of Examples 1 to 8 are replaced by equivalent amounts of the functionally equivalent alternating copolymers, copolymers of random distribution, double stranded naturally occurring ribonucleic acids, hybrid double stranded complexes of homopolymers and chemically altered polynucleotide.

EXAMPLE 10

The enhancement of antibody formation by a synthetic double stranded polynucleotide (Poly I:C) to that obtained from a naturally occurring double stranded polynucleotide (MU-9), derived from E. Coli., is compared in Table VII, using influenza vaccine containing 400 CCA units of $A_2$/Aichi/2/68 and 300 CCA units of B/Mass/3/66 virus strains, with and without Adjuvant 65 and with and without one of the polynucleotides at 160 $\mu$g./0.5 ml. The results given in the table are those from a single injection in guinea pig at time zero.

Examination of the data in the table shows clearly that, after 28 days, animals innoculated with influenza virus vaccine along or with influenza virus vaccine plus MU-9 had about the same antibody titer, while animals receiving MU-9 alone had not shown development of antibodies. When Adjuvant 65 was used with the vaccine, a significant increase took plate in the antibody titer. When MU-9 was added in addition to Adjuvant 65 to the vaccine, a still further increase in antibody titer was seen, but no antibodies were detected when the adjuvant and the polynucleotide were used along, without the influenza virus vaccine. The substitution of Poly I:C for MU-9 in the vaccine-adjuvantpolynucleotide combination also gave a very high antibody titers.

EXAMPLE 11

The procedure of Example 1 is followed using, instead of adjuvant 65 a similar adjuvant in which the Arlacel A (which is only approximately 20% mannide monooleate) is replaced with one-fifth the guantity of pure isomannide monooleate. The composition of this modified adjuvant is 94% (V/V) peanut oil, 2% (V/V) pure isomannide monooleate and 4% (V/V) aluminum monostearate. This adjuvant gives results with poly I:C and vaccines similar to those with Adjuvant 65.

EXAMPLE 12

A water-in-oil adjuvant boosted vaccine is prepared from a mixture of
48% peanut oil
2% aluminum monostearate USP
50% aqueous influenza virus vaccine The mixture is cooled to 4°C. and subjected to very high shear emulsification, cooling each time to 4° between cycles. An emulsion, stable for weeks, is obtained which possesses enhanced antigenic activity. The activity is further enhanced by addition of a polynucleotide such as poly I:C and MU-9.

Table Ia

Guinea pig antibody responses to 1 injection of 600 CCA units of influenza virus vaccine used in various formulations
Geometric mean HI antibody titers at indicated months

| Influenza Vaccine Preparation | A/PR/8 | | | | | A2/Jap/170 | | | | | A2/Taiwan | | | | | B/Mass | | | | |
|---|---|---|---|---|---|---|---|---|---|---|---|---|---|---|---|---|---|---|---|---|
| | 0 | 1 | 2 | 3 | 4 | 0 | 1 | 2 | 3 | 4 | 0 | 1 | 2 | 3 | 4 | 0 | 1 | 2 | 3 | 4 |
| Aqueous | 1[a] | 69 | 64 | 9 | 11 | 1 | 8 | 6 | 9 | 8 | 1 | 5 | 2 | 3 | 5 | 1 | 5 | 1 | 2 | 1 |
| aqueous poly + A:U | 1 | 80 | 40 | 20 | 17 | 1 | 5 | 8 | 20 | 11 | 1 | 5 | 4 | 15 | 6 | 1 | 8 | 1 | 3 | 2 |
| aqueous poly + A:U I:C | 1 15 | 69 2 | 30 13 | 14 6 | 9 1 | 8 | 1 | 5 | 6 | 1 | 7 | 23 | 1 | 2 | | | | | | |
| adjuvant 65 | 1 | 548 | 208 | 69 | 32 | 1 | 181 | 111 | 91 | 49 | 1 | 80 | 91 | 97 | 56 | 1 | 91 | 34 | 5 | 20 |
| adjuvant 65 + poly A:U | 1 | 546 | 320 | 128 | 64 | 1 | 256 | 274 | 158 | 128 | 1 | 137 | 274 | 194 | 128 | 1 | 137 | 111 | 97 | 69 |
| adjuvant 65 + poly I:C | 1 | 832 | 416 | 223 | 137 | 1 | 631 | 274 | 223 | 194 | 1 | 631 | 274 | 223 | 194 | 1 | 776 | 239 | 223 | 194 |

[a] All titers are expressed as the reciprocal of the serum dilution.

Table Ib

Guinea pig antibody responses to 2 injections a month apart of 600 CCA units each of influenza virus vaccine used in various formulations
Geometric mean HI antibody titers at indicated months

| Influenza Virus Preparation | A/PR/8 | | | | | As/Jap/170 | | | | | A2/Taiwan | | | | | B/Mass | | | | |
|---|---|---|---|---|---|---|---|---|---|---|---|---|---|---|---|---|---|---|---|---|
| | 0 | 1 | 2 | 3 | 4 | 0 | 1 | 2 | 3 | 4 | 0 | 1 | 2 | 3 | 4 | 0 | 1 | 2 | 3 | 4 |
| aqueous | 1 | 56 | 64 | 12 | 9 | 1 | 14 | 34 | 24 | 17 | 1 | 7 | 11 | 11 | 9 | 1 | 10 | 23 | 8 | 5 |
| aqueous +poly A:U | 1 | 60 | 137 | 28 | 18 | 1 | 1 | 51 | 28 | 34 | 1 | 1 | 40 | 28 | 24 | 1 | 7 | 52 | 39 | 16 |
| aqueous + poly I:C | 1 | 52 | 160 | 45 | 28 | 1 | 12 | 239 | 104 | 69 | 1 | 7 | 69 | 60 | 49 | 1 | 11 | 45 | 34 | 28 |
| adjuvant 65 | 1 | 446 | 388 | 137 | 56 | 1 | 239 | 320 | 223 | 160 | 1 | 119 | 208 | 223 | 111 | 1 | 104 | 160 | 223 | 111 |
| adjuvant 65 + poly A:U | 1 | 640 | 416 | 223 | 181 | 1 | 223 | 320 | 388 | 194 | 1 | 181 | 320 | 548 | 223 | 1 | 274 | 548 | 274 | 181 |
| adjuvant 65 + poly I:C | 1 | 640 | 724 | 362 | 239 | 1 | 512 | 640 | 478 | 362 | 1 | 320 | 548 | 416 | 320 | 1 | 274 | 274 | 416 | 239 |

Table Ic

Guinea pig antibody responses to 1 injection of 150 CCA units of influenza virus vaccine used in various formulations
Geometric mean HI antibody titers at indicated months

| Influenza Virus Vaccine Preparation | A/PR/8 | | | | | A2/Jap/17C | | | | | A2/Taiwan | | | | | B/Mass | | | | |
|---|---|---|---|---|---|---|---|---|---|---|---|---|---|---|---|---|---|---|---|---|
| | 0 | 1 | 2 | 3 | 4 | 0 | 1 | 2 | 3 | 4 | 0 | 1 | 2 | 3 | 4 | 0 | 1 | 2 | 3 | 4 |
| aqueous | 1 | 64 | 45 | 8 | 6 | 1 | 7 | 10 | 11 | 9 | 1 | 7 | 3 | 6 | 10 | 1 | 8 | 1 | 2 | 2 |
| aqueous + poly A:U | 1 | 1 | 1 | 1 | 1 | 1 | 1 | 1 | 1 | 1 | 1 | 1 | 1 | 1 | 1 | 1 | 1 | 1 | 1 | 1 |
| aqueous | | | | | | | | | | | | | | | | | | | | |

Table Ic—Continued

Guinea pig antibody responses to 1 injection of 150 CCA units of influenza virus vaccine used in various formulations
Geometric mean HI antibody titers at indicated months

| Influenza Virus Vaccine Preparation | A/PR/8 | | | | | A2/Jap/17C | | | | | A2/Taiwan | | | | | B/Mass | | | | |
|---|---|---|---|---|---|---|---|---|---|---|---|---|---|---|---|---|---|---|---|---|
| | 0 | 1 | 2 | 3 | 4 | 0 | 1 | 2 | 3 | 4 | 0 | 1 | 2 | 3 | 4 | 0 | 1 | 2 | 3 | 4 |
| + poly I:C | 1 | 40 | 34 | 5 | 6 | 1 | 12 | 2 | 13 | 7 | 1 | 4 | 2 | 6 | 3 | 1 | 6 | 1 | 3 | 2 |
| adjuvant 65 | 1 | 478 | 181 | 28 | 28 | 1 | 97 | 181 | 64 | 40 | 1 | 45 | 56 | 56 | 40 | 1 | 40 | 24 | 20 | 28 |
| adjuvant 65 + poly A:U | 1 | 388 | 223 | 79 | 40 | 1 | 256 | 80 | 80 | 56 | 1 | 160 | 80 | 64 | 56 | 1 | 64 | 223 | 64 | 28 |
| adjuvant 65 + poly I:C | 1 | 546 | 362 | 128 | 119 | 1 | 548 | 388 | 181 | 137 | 1 | 320 | 274 | 194 | 160 | 1 | 223 | 128 | 111 | 60 |

Table Id

Guinea pig antibody responses to 2 injections a month apart of 150 CCA units each of influenza virus vaccine used in various formulations
Geometric mean HI antibody titers at indicated months

| Vaccine Preparation | A/PR/8 | | | | | A2/JAP/170 | | | | | A2/Taiwan | | | | | B/Mass | | | |
|---|---|---|---|---|---|---|---|---|---|---|---|---|---|---|---|---|---|---|---|
| | 0 | 1 | 2 | 3 | 4 | 0 | 1 | 2 | 3 | 4 | 0 | 1 | 2 | 3 | 4 | 0 | 1 | 2 3 | 4 |
| aqueous | 1 | 80 | 143 | 30 | 20 | 1 | 15 | 45 | 30 | 23 | 1 | 8 | 20 | 30 | 20 | 1 | 11 | 16 15 | 17 |
| aqueous + poly A:U | 1 | 1 | 1 | 1 | 1 | 1 | 1 | 1 | 1 | 1 | 1 | 1 | 1 | 1 | 1 | 1 | 1 | 1 1 | 1 |
| aqueous + poly I:C | 1 | 57 | 320 | 40 | 20 | 1 | 14 | 113 | 63 | 40 | 1 | 7 | 67 | 20 | 16 | 1 | 11 | 57 32 | 16 |
| adjuvant 65 | 1 | 359 | 226 | 34 | 20 | 1 | 113 | 143 | 57 | 48 | 1 | 71 | 101 | 80 | 48 | 1 | 32 | 63 48 | 24 |
| adjuvant 65 + poly A:U | 1 | 1437 | 640 | 202 | 127 | 1 | 254 | 359 | 320 | 160 | 1 | 226 | 359 | 359 | 180 | 1 | 113 | 320 254 | 160 |
| adjuvant 65 + poly I:C | 1 | 2032 | 844 | 160 | 135 | 1 | 320 | 640 | 279 | 190 | 1 | 160 | 320 | 243 | 190 | 1 | 320 | 422 320 | 190 |

TABLE II

ANTIBODY RESPONSES IN MONKEYS INJECTED ON ONE OCCASION WITH 600 CCA OF INFLUENZA VIRUS VACCINE OF AQUEOUS OR ADJUVANT 65 FORMULATION THE LATTER WITH OR WITHOUT POLYNUCLEOTIDE.

Geometric Mean HI Antibody at Indicated Month

| Influenza Virus Vaccine Formulation | A2/Jap./170 | | | | | | | A2/Taiwan | | | | | | |
|---|---|---|---|---|---|---|---|---|---|---|---|---|---|---|
| | 0 | 1 | 2 | 3 | 4 | 5 | 6 | 0 | 1 | 2 | 3 | 4 | 5 | 6 |
| Aqueous | 1+ | 12 | 1 | 1 | 1 | 1 | 1 | 1 | 4 | 2 | 2 | 1 | 1 | 1 |
| Adjuvant 65 | 1 | 160 | 80 | 86 | 26 | 12 | 7 | 1 | 16 | 70 | 70 | 26 | 9 | 9 |
| Adjuvant 65 Poly I:C | 1 | 557 | 735 | 243 | 137 | 80 | 60 | 1 | 557 | 485 | 279 | 137 | 80 | 69 |

Geometric Mean HI Antibody at Indicated Month

| Influenza Virus Vaccine Formulation | A/PR/8 | | | | | | | B/Mass | | | | | | |
|---|---|---|---|---|---|---|---|---|---|---|---|---|---|---|
| | 0 | 1 | 2 | 3 | 4 | 5 | 6 | 0 | 1 | 2 | 3 | 4 | 5 | 6 |
| Aqueous | 1 | 10 | 2 | 3 | 1 | 1 | 3 | 1 | 3 | 1 | 1 | 1 | 1 | 1 |
| Adjuvant 65 | 1 | 243 | 92 | 70 | 30 | 12 | 17 | 1 | 211 | 121 | 92 | 26 | 18 | 30 |
| +Adjuvant 65 +Poly I:C | 1 | 557 | 965 | 422 | 208 | 119 | 104 | 1 | 640 | 965 | 485 | 208 | 160 | 137 |

+= reciprocal of initial serum dilution
W/O = water-in-oil emulsion

TABLE III

GUINEA PIG ANTIBODY RESPONSES TO ONE INJECTION OF 600 CCA UNITS OF INFLUENZA VIRUS VACCINE USED IN VARIOUS FORMULATIONS

Geometric Mean HI Antibody Titers at Indicated Month

| Influenza Virus Vaccine Preparation | A2/Jap./170 | | | | A2/Taiwan | | | | B/Mass | | | |
|---|---|---|---|---|---|---|---|---|---|---|---|---|
| | 0 | 1 | 2 | 4 | 0 | 1 | 2 | 4 | 0 | 1 | 2 | 4 |
| Aqueous | 1+ | 9 | 6 | 6 | 1 | 28 | 20 | 20 | 1 | 6 | 7 | 7 |
| Aqueous + Poly I:C | 1 | 11 | 8 | 9 | 1 | 42 | 30 | 32 | 1 | 6 | 3 | 5 |
| Mineral Oil** (W/O)* | 1 | 548 | 1096 | 1024 | 1 | 1096 | 1434 | 1096 | 1 | 776 | 1434 | 1946 |
| Mineral Oil + Poly I:C (W/O) | 1 | 388 | 2355 | 1741 | 1 | 766 | 3072 | 2519 | 1 | 1260 | 4383 | 2519 |

*W/O = water-in-oil emulsion
* Mineral Oil = incomplete Freund type emulsion
+= reciprocal of initial serum dilution

TABLE IV

GUINEA PIG ANTIBODY RESPONSES TO ONE INJECTION OF 600 CCA UNITS OF INFLUENZA VIRUS VACCINE USED IN VARIOUS FORMULATIONS

| Influenza Virus Vaccine Preparation | Geometric Mean HI Antibody Titers at Indicated Month | | | | | | | | | | | |
|---|---|---|---|---|---|---|---|---|---|---|---|---|
| | $A_2$/Japan/170 | | | | $A_2$Taiwan | | | | B/Mass. | | | |
| | 0 | 1 | 2 | 4 | 0 | 1 | 2 | 4 | 0 | 1 | 2 | 4 |
| Aqueous | 1+ | 9 | 6 | 6 | 1 | 28 | 20 | 20 | 1 | 6 | 7 | 7 |
| Aqueous + Poly I:C | 1 | 11 | 8 | 9 | 1 | 42 | 30 | 32 | 1 | 6 | 3 | 5 |
| Peanut Oil (O/W)* | 1 | 39 | 24 | 17 | 1 | 79 | 40 | 40 | 1 | 2 | 6 | 6 |
| Peanut Oil (O/W) + Poly I:C | 1 | 40 | 49 | 39 | 1 | 128 | 97 | 60 | 1 | 24 | 20 | 20 |

O/W* = oil-in-water emulsion

TABLE V

GUINEA PIG ANTIBODY RESPONSES TO ONE INJECTION OF 600 CCA UNITS OF INFLUENZA VIRUS VACCINE USED IN VARIOUS FORMULATIONS WITH AND WITHOUT POLYNUCLEOTIDES

| Type Influenza Virus Vaccine Preparation | Concentration Polynucleotide (meg/Dose) | | | Geometric Mean HI Antibody Titer at Indicated Month | | | | | | | | | | | | | | | |
|---|---|---|---|---|---|---|---|---|---|---|---|---|---|---|---|---|---|---|---|
| | Poly I | Poly C | Poly I:C | C | A2/Jap./170 | | | | | A2/Taiwan | | | | | B/Mass | | | | |
| | | | | | 1 | 2 | 3 | 4 | 0 | 1 | 2 | 3 | 4 | 0 | 1 | 2 | 3 | 4 | |
| Aqueous | 260 | — | — | 1+ | 1 | 1 | 1 | 1 | 1 | 1 | 1 | 1 | 1 | 1 | 1 | 1 | 1 | 1 | |
| | 130 | — | — | 1 | 18 | 12 | 5 | 3 | 1 | 8 | 1 | 2 | 2 | 1 | 1 | 1 | 1 | 1 | |
| | — | 260 | — | 1 | 7 | 14 | 12 | 11 | 1 | 10 | 6 | 3 | 2 | 1 | 1 | 1 | 1 | 1 | |
| | — | 130 | — | 1 | 21 | 23 | 16 | 8 | 1 | 7 | 12 | 5 | 3 | 1 | 1 | 1 | 2 | 2 | |
| | — | — | 260 | 1 | 8 | 30 | 11 | 17 | 1 | 1 | 12 | 3 | 7 | 1 | 1 | 1 | 3 | 2 | |
| | — | — | — | 1 | 23 | 12 | 4 | 4 | 1 | 6 | 4 | 1 | 3 | 1 | 2 | 1 | 2 | 1 | |
| Alum* | 260 | — | — | 1 | 60 | 45 | 32 | 30 | 1 | 34 | 20 | 11 | 9 | 1 | 28 | 33 | 26 | 18 | |
| | 130 | — | — | 1 | 73 | 45 | 42 | 40 | 1 | 37 | 23 | 20 | 21 | 1 | 39 | 43 | 32 | 30 | |
| | — | 260 | — | 1 | 37 | 30 | 26 | 24 | 1 | 32 | 14 | 17 | 8 | 1 | 37 | 53 | 24 | 16 | |
| | — | 130 | — | 1 | 45 | 45 | 34 | 37 | 1 | 37 | 37 | 24 | 23 | 1 | 26 | 61 | 30 | 30 | |
| | — | — | 260 | 1 | 64 | 42 | 34 | 45 | 1 | 34 | 24 | 15 | 15 | 1 | 14 | 25 | 11 | 14 | |
| | — | — | — | 1 | 28 | 34 | 32 | 24 | 1 | 26 | 21 | 26 | 18 | 1 | 24 | 12 | 30 | 34 | |
| Adjuvant 65 (W/O)** | 260 | — | — | 1 | 97 | 119 | 119 | 85 | 1 | 73 | 73 | 73 | 73 | 1 | 91 | 45 | 97 | 119 | |
| | 130 | — | — | 1 | 194 | 111 | 80 | 104 | 1 | 73 | 97 | 64 | 69 | 1 | 64 | 37 | 60 | 73 | |
| | — | 260 | — | 1 | 128 | 119 | 119 | 119 | 1 | 97 | 104 | 80 | 85 | 1 | 52 | 28 | 52 | 73 | |
| | — | 130 | — | 1 | 104 | 147 | 111 | 104 | 1 | 85 | 91 | 60 | 80 | 1 | 56 | 49 | 69 | 85 | |
| | — | — | 260 | 1 | 362 | 388 | 147 | 256 | 1 | 239 | 446 | 208 | 223 | 1 | 169 | 137 | 147 | 111 | |
| | — | — | — | 1 | 73 | 119 | 80 | 104 | 1 | 64 | 104 | 73 | 40 | 1 | 20 | 24 | 34 | 42 | |

+=reciprocal of initial serum dilution
*=8.0 mg/dose of potassium aluminum sulfate (alum)
**W/O= water-in-oil emulsion

TABLE VI

GUINEA PIG ANTIBODY RESPONSES TO ONE INJECTION OF INACTIVATED HEPTAVALENT RESPIRATORY AGENT VACCINE EMULSIFIED IN ADJUVANT 65 WITH AND WITHOUT POLYNUCLEOTIDES

| Component of Heptavalent Vaccine | Type Serological Assay | Geometric Mean Antibody at Indicated Month | | | | | | | |
|---|---|---|---|---|---|---|---|---|---|
| | | 0 | | 1 | | 2 | | 4 | |
| | | With Poly I:C | Without Poly I:C | With Poly I:C | Without Poly I:C | With Poly I:C | Without Poly I:C | With Poly I:C | Without Poly I:C |
| Parainfluenza Virus Type 1 | Neut. | 1+ | 1 | 7 | 2 | 7 | 3 | 5 | 3 |
| Parainfluenza Virus Type 2 | Neut. | 1 | 1 | 13 | 10 | 17 | 11 | 7 | 11 |
| Parainfluenza Virus Type 3 | Neut. | 1 | 1 | 8 | 7 | 6 | 3 | 5 | 3 |
| Respiratory Syncytial Virus | Neut. | 1 | 1 | 17 | 3 | 28 | 6 | 9 | 6 |
| Mycoplasma Pneumonia | Complement Fixation | 1 | 1 | 82 | 9 | 510 | 17 | 169 | 5 |
| Influenza Virus Strain A2/Taiwan | Hemagglutination Inhibition | 1 | 1 | 512 | 169 | 181 | 111 | 80 | 73 |
| Influenza Virus Strain B/Mass. | Hemagglutination Inhibition | 1 | 1 | 119 | 42 | 128 | 40 | 64 | 26 |

+ = reciprocal of initial serum dilution

TABLE VII

GUINEA PIG ANTIBODY RESPONSES TO ONE INJECTION OF VARIOUS CONCENTRATIONS OF INFLUENZA VIRUS VACCINE USED AS AQUEOUS OR ADJUVANT 65 TYPE FORMULATIONS WITH OR WITHOUT POLYNUCLEOTIDES.

| Influenza Virus Vaccine Formulation | CCA Units Per Dose | Geometric Mean HI Antibody Response at Indicated Month | | | | | |
|---|---|---|---|---|---|---|---|
| | | A2/Jap./170 | | A2/Taiwan | | B/Mass. | |
| | | 0 | 1 | 0 | 1 | 0 | 1 |
| Aqueous without Poly I:C | 500 | 1* | 64 | 1 | 12 | 1 | 3 |
| | 100 | 1 | 24 | 1 | 3 | 1 | 3 |
| | 50 | 1 | 23 | 1 | 1 | 1 | 6 |
| | 10 | 1 | 4 | 1 | 1 | 1 | 5 |
| | 0 | 1 | 1 | 1 | 1 | 1 | 1 |
| Adjuvant 65 without Poly I:C | 500 | 1 | 91 | 1 | 194 | 1 | 34 |
| | 100 | 1 | 128 | 1 | 137 | 1 | 20 |
| | 50 | 1 | 80 | 1 | 137 | 1 | 23 |
| | 10 | 1 | 69 | 1 | 39 | 1 | 17 |
| | 0 | 1 | 1 | 1 | 1 | 1 | 1 |
| Adjuvant 65 with 260 mcg Poly I:C | 500 | 1 | 446 | 1 | 274 | 1 | 97 |
| | 100 | 1 | 274 | 1 | 274 | 1 | 39 |
| | 50 | 1 | 320 | 1 | 194 | 1 | 49 |
| | 10 | 1 | 388 | 1 | 137 | 1 | 23 |
| | 0 | 1 | 1 | 1 | 1 | 1 | 1 |
| Adjuvant 65 with 26 mcg Poly I:C | 500 | 1 | 388 | 1 | 256 | 1 | 56 |
| | 100 | 1 | 512 | 1 | 274 | 1 | 49 |
| | 50 | 1 | 274 | 1 | 362 | 1 | 56 |
| | 10 | 1 | 256 | 1 | 362 | 1 | 24 |
| | 0 | 1 | 1 | 1 | 1 | 1 | 1 |
| Adjuvant 65 with 2.6 mcg Poly I:C | 500 | 1 | 362 | 1 | 256 | 1 | 28 |
| | 100 | 1 | 111 | 1 | 194 | 1 | 10 |
| | 50 | 1 | 256 | 1 | 137 | 1 | 17 |
| | 10 | 1 | 320 | 1 | 128 | 1 | 3 |
| | 0 | 1 | 1 | 1 | 1 | 1 | 1 |

*= reciprocal of initial serum dilution

Table VIII

| Vaccine Group | Type Polynucleotide | Geometric Mean HI Antibody Titer of Indicated Influenza Virus Strain at Indicated Time | | | |
|---|---|---|---|---|---|
| | | A2/Aichi/2/68 | | B/Mass./3/66 | |
| | | 0 | 28 days | 0 | 28 days |
| Aqueous flu | none | <1:10 | 1:3 | <1:10 | 1:9 |
| Aqueous flu | MU-9[A] | <1:10 | 1:2 | <1:10 | 1:5 |
| None | MU-9 | <1:10 | <1:10 | <1:10 | <1:10 |
| Adj. 65 flu | none | <1:10 | 1:239 | <1:10 | 1:169 |
| Adj. 65 flu | MU-9 | <1:10 | 1:478 | <1:10 | 1:338 |
| Adjuvant 65 | MU-9 | <1:10 | <1:10 | <1:10 | <1:10 |
| Adj. 65 flu | Poly I:C[AA] | <1:10 | 1:640 | <1:10 | 1:446 |
| Saline | none | <1:10 | <1:10 | <1:10 | <1:10 |

[A] 160 mcg/0.5 ml. (derived from *E. Coli*)
[AA] 160 mcg/0.5 ml.

What is claimed is:

1. In a vaccine preparation for administration to a living host of the type consisting of an antigen and (an) a water-in-oil or oil-in-water emulsion type adjuvant, wherein the improvement comprises (the addition to the vaccine of) an additional component in said vaccine preparation which comprises a fraction of a microgram to 10 milligrams per dose of an agent selected from the group consisting of:

1. a homopolymer selected from the group consisting of poly I, poly C, poly A, poly U, poly X, poly G and poly DHU, of molecular weight $1 \times 10^5$ to $1.5 \times 10^6$,
2. a double stranded complex of two of the homopolymers,
3. an alternating copolymer selected from the group consisting of poly IC, poly AU, poly AI, poly IU, poly CU, poly AC, poly GU, poly AG of molecular weight $1 \times 10^5$ to $1.5 \times 10^6$,
4. naturally occurring DS-RNA of molecular weight of $1 \times 10^5$ to $1.5 \times 10^6$,
5. hybrid double stranded polymers selected from the group consisting of poly G:dC, poly dG:C, poly I:dC and poly dI:C, wherein each of the homopolymers poly dC, poly dG, and poly dI are of molecular weight $1 \times 10^5$ to $1.5 \times 10^6$, and
6. a known chemically altered homopolymer selected from poly $N_1$-methyladenylate, poly "6-methyladenylate", poly $N_7$-methylinosinate, poly $N_7$-methylguanylate, poly 5-methyluridylate, poly 5-fluorouridylate, poly 5-bromouridylate, poly 5-iodouridylate, poly 5-bromocytidylate and poly 5-iodocytidylate.

2. The vaccine preparation of claim 1 wherein the improvement comprises the addition of an alternating copolymer selected from poly IC, poly AU, poly AI, poly IU, poly CU, poly AC, poly GU, and poly AG.

3. The vaccine preparation of claim 1, wherein the improvement comprises the addition of naturally occurring DS-RNA.

4. The vaccine of claim 1, wherein the antigen is derived from influenza viruses.

5. The vaccine preparation of claim 1, wherein the improvement comprises the addition of a double stranded complex of two of the homopolymers.

6. The vaccine preparation of claim 5, wherein the double stranded complex is poly I:C or poly A:U.

7. The vaccine preparation of claim 1, wherein the adjuvant is a water-in-oil emulsion.

8. The vaccine preparation of claim 7, wherein the improvement comprises the addition of a double stranded complex of two of the homopolymers.

9. The vaccine preparation of claim 8, wherein the double stranded complex is poly I:C or poly A:U.

10. The vaccine of claim 1, wherein the adjuvant is a water-in-vegetable oil emulsion.

11. The vaccine of claim 10 in which the adjuvant comprises 86% (V/V) refined peanut oil, 10% (V/V) mannide monooleate and 4% (V/V) aluminum monostearate.

12. The vaccine of claim 10 in which the adjuvant is 94% peanut oil, 2% pure mannide monooleate and 4% aluminum stearate.

13. The vaccine of claim 10 which is an emulsion of 48% peanut oil, 2% aluminum monostearate and 50% of aqueous virus vaccine to which is added said polynucleotide.

14. In an adjuvant type influenza vaccine wherein the improvement comprises (the addition of) an additional component which comprises a fraction of a microgram to about 10 milligrams per dose of a double stranded complex selected from poly I:C and poly A:U wherein each of the homopolymers comprising said complexes has a molecular weight of $1 \times 10^5$ to $1.5 \times 10^6$.

15. The vaccine of claim 14 in which the polynucleotide is poly I:C.

* * * * *